F. A. STOUFFER AND H. A. ENGLAND.
PISTON PACKING RING.
APPLICATION FILED AUG. 21, 1919.
1,369,203.
Patented Feb. 22, 1921.
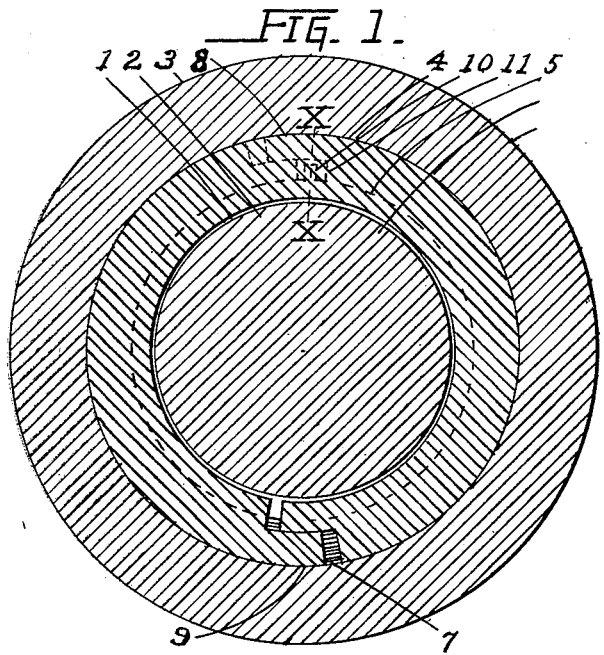
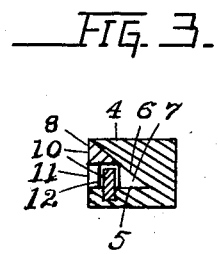
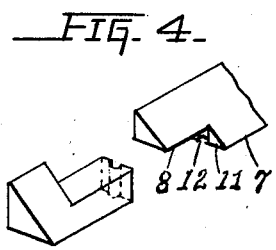
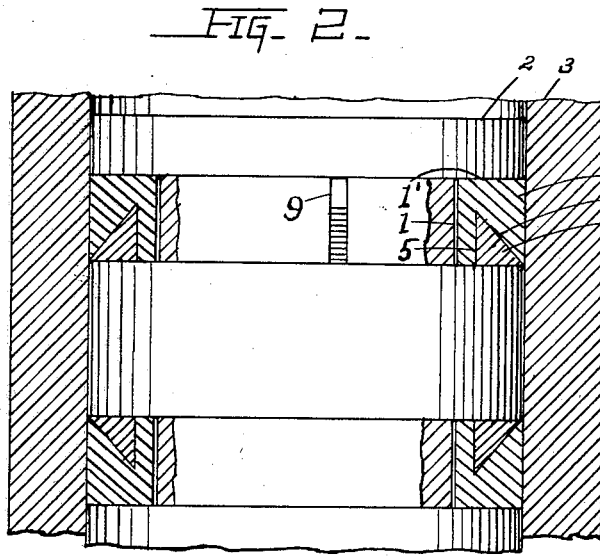
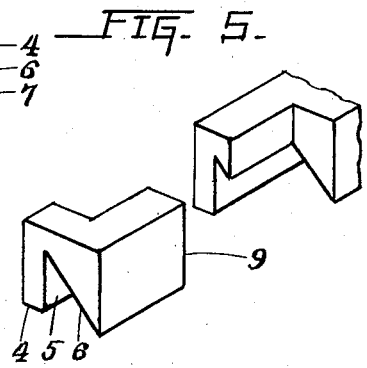
INVENTORS
Frank A. Stouffer
Harry A. England
BY
George W. Hinton
ATTORNEY

UNITED STATES PATENT OFFICE.

FRANK A. STOUFFER, OF NEAR ST. JOSEPH, AND HARRY A. ENGLAND, OF ST. JOSEPH, MISSOURI.

PISTON PACKING-RING.

1,369,203.

Specification of Letters Patent.     Patented Feb. 22, 1921.

Application filed August 21, 1919. Serial No. 319,011.

*To all whom it may concern:*

Be it known that we, FRANK A. STOUFFER and HARRY A. ENGLAND, citizens of the United States, said FRANK A. STOUFFER residing near St. Joseph, in the county of Andrew, State of Missouri, and HARRY A. ENGLAND residing at St. Joseph, county of Buchanan, State of Missouri, have invented certain new and useful Improvements in Piston Packing-Rings, of which the following is a specification, reference being had therein to the accompanying drawing.

Our invention relates to improvements in that class of piston packing rings which are used for packing the pistons of internal combustion engines, air and ammonia pumps, steam engines and the like, and the objects of our improvements are, first: to provide a simple, substantial, durable and efficient ring of this class which shall be cheap in cost of manufacture, second: to so construct and arrange the parts of a piston packing ring that by their elastical expansion they shall, at all times while in use, be pressed against the radial surfaces respectively of the ring channel and against the inner surface of the cylinder in which they are used, third: to provide means whereby the two ring members of which the ring is composed, shall be held against rotative movement with relation to each other, thereby preventing the overlapped ends respectively of the two members from moving into register with each other, thus preventing leakage through the members at their ends.

We attain these objects by the devices illustrated in the accompanying drawings, in which:

Figure 1 is a top view of the ring, certain parts of the piston and cylinder being broken away. Fig. 2 is a side view of a pair of rings, certain parts being broken away. Fig. 3 is a vertical section of the ring, on the line X X, seen in Fig. 1.

Fig. 4 is a detailed view in perspective of the parts seen in Fig. 3, showing the overlapped ends of the inset member in fully expanded position. Fig. 5 is a view similar to Fig. 4, showing the overlapped ends of the body member.

Referring to Figs. 1 and 2, the annular ring channel 1 is formed in the annular surface of the piston 2, which reciprocates longitudinally in the cylinder 3.

The hereinafter described packing ring is forcibly expanded and passed over one end of said piston, into register with said channel, into which it contracts; after which said ring is forcibly contracted and the piston and the thus contracted ring are passed into said cylinder.

The packing ring comprises the body member 4 and the inset member 7.

The annular channel 5 is formed in one of the flat sides of said body member, the side 6 of which is inclined inward from one of its outer corners. The other side of said channel is formed parallel with the inner annular surface of said body member, thus forming an annular channel, that is triangular in form transversely.

The inset member 7 is of the same form as said channel and is set into the same, with its overlapped ends 8 diametrically opposite to the overlapped ends 9, which are formed on the member 4, as seen in Fig. 1. Said ends are thus disposed so that one of the members shall close the opening formed between the overlapped ends of the other member, thus avoiding leakage at these points.

In order to prevent rotative movement with relation to each other, of the members 4 and 7, we have provided the radially disposed stud 10, (see Figs. 3 and 4,) one end of which is secured in the body member 4 while its other end portion extends therefrom into the inner space between the shoulders 11 which are formed on the ends of the inset member 7.

The concaved recesses 12 are formed in said shoulders, for the reception of the stud 10, when said member is fully contracted.

In operation, as the inner surface of the cylinder 3 and the outer peripheries of the ring members 4 and 7 become worn from use, said members expand, forming a tight joint between said surface and peripheries. Due to the inclined surface 6, of channel 5 and the corresponding inclined surface of the inset member 7, the expansion of said member causes a sliding movement of the same along said inclined surface of the channel, which forces the members against their respective sides 1' of the ring channel 1, thereby forming tight joints, which prevent leakage therethrough at these points.

The described action of said inset member also holds said inclined surfaces tightly against each other, thereby preventing leakage therebetween.

Having fully described our invention, what we claim as new, and desire to secure by Letters Patent is:

1. A piston packing ring comprising an annular body member of rectangular form in cross section in which an annular channel is formed in one of its flat sides the outer side of said channel being inclined and terminating at one of the outer corners of said body member; an inset member in said channel said inset member being of such form that it normally fills said channel said members having flat sides which fit against the radially formed sides of a ring channel in a piston; each one of said members having overlapped ends and being elastically expansive for yieldably holding their outer peripheries against the inner surface of a cylinder and for similarly holding the inclined surface of said inset member against the inclined surface of the channel formed in said body member, thereby yieldably holding the flat sides of both members in contact with the radial surfaces of the channel which is formed in said piston.

2. An elastically expansive piston packing ring comprising an annular body member of rectangular form in cross section in which an annular channel is formed in one of its flat sides the outer side of said channel being inclined and terminating at one of the outer corners of said body member; an inset member in said channel said inset member being of such form that it normally fills said channel; both of said members having shouldered overlapped ends and flat sides which fit against the radially formed sides of a ring channel in a piston; a radially disposed stud the inner end of which is secured in said body member with its outer end portion extending therefrom into the space between the inner shoulders of the overlapped ends of said inset member said shoulders having recesses formed therein for the reception of said portion of said stud when said inset member is fully contracted, for holding the overlapped ends of said members out of register with each other.

In testimony whereof we affix our signatures.

FRANK A. STOUFFER.
HARRY A. ENGLAND.